B. P. & F. I. REMY.
MILKING MACHINE.
APPLICATION FILED FEB. 14, 1908. RENEWED APR. 29, 1915.
1,142,626.
Patented June 8, 1915.
2 SHEETS—SHEET 2.
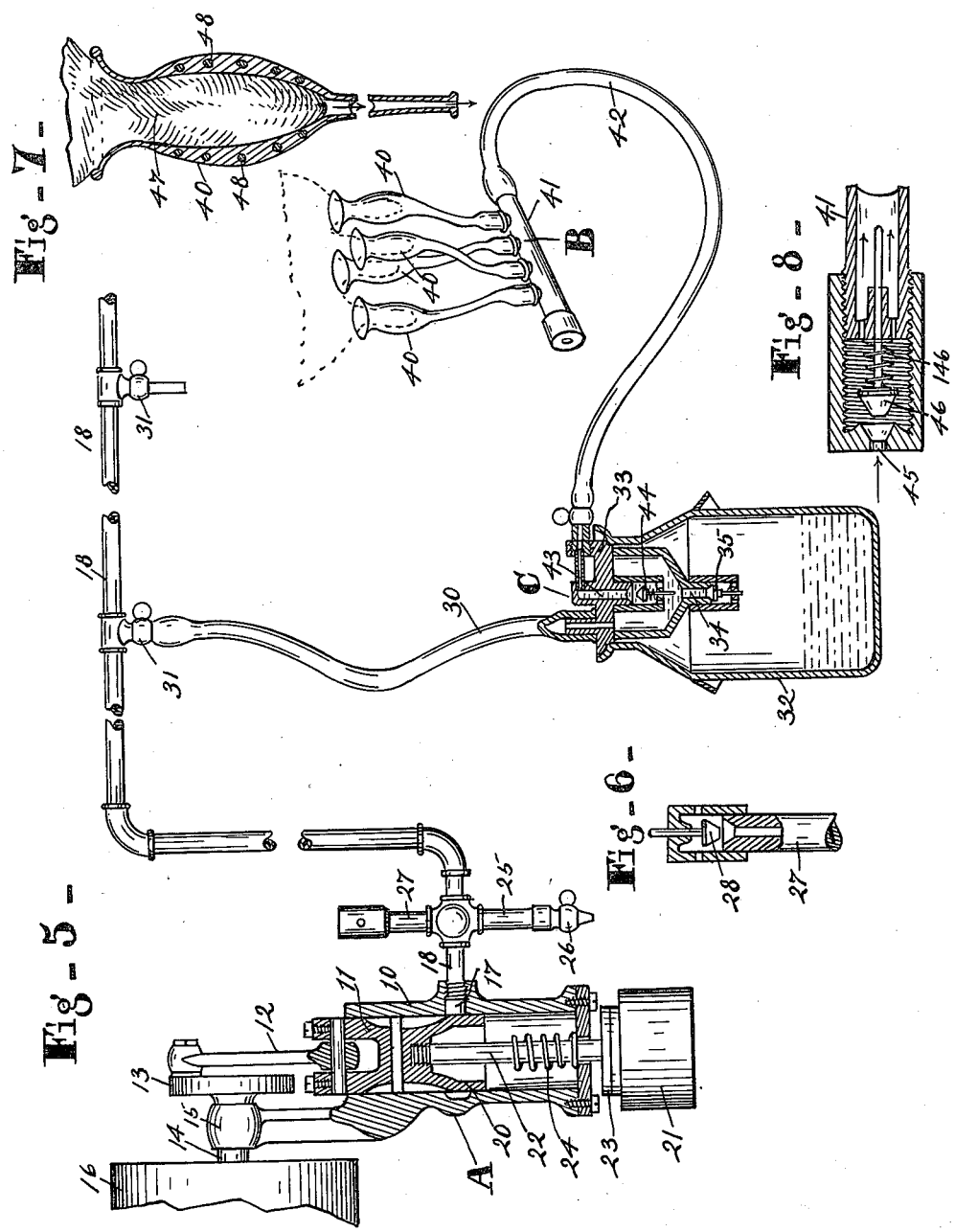
WITNESSES:
W. M. Gentle.
Oline Breeden
INVENTORS.
Benjamin Perry Remy and
Frank Irwin Remy.
BY
V. H. Lockwood
ATTORNEY.

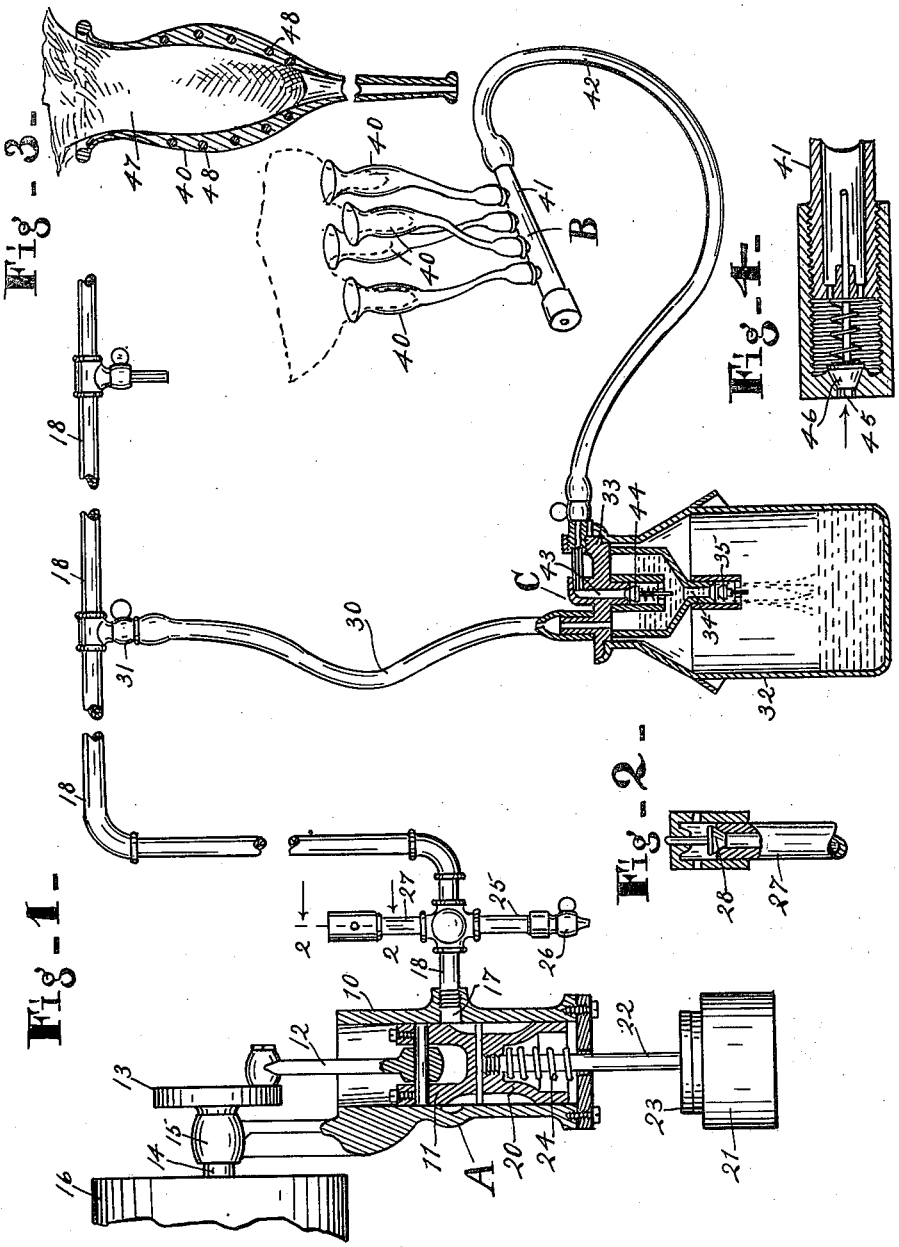

UNITED STATES PATENT OFFICE.

BENJAMIN PERRY REMY AND FRANK IRWIN REMY, OF ANDERSON, INDIANA.

MILKING-MACHINE.

1,142,626.  Specification of Letters Patent.  Patented June 8, 1915.

Application filed February 14, 1908, Serial No. 415,952. Renewed April 29, 1915. Serial No. 24,794.

*To all whom it may concern:*

Be it known that we, BENJAMIN PERRY REMY and FRANK IRWIN REMY, both of Anderson, county of Madison, and State of Indiana, have invented a certain new and useful Milking-Machine; and we do hereby declare that the following is a full, clear, and exact description thereof, reference being had to the accompanying drawings, in which like letters refer to like parts.

This invention relates to apparatus for milking cows or other animals and has for its chief object improvement in the mode of operation of such apparatus whereby it will perform the operation of milking in an efficient and satisfactory manner and thoroughly "strip" the cows, and also the simplification of the apparatus and freedom from complicated and delicate mechanism, so that it can be readily operated and kept in order under ordinary conditions by operators not especially skilled in the use of machinery.

A further object is to provide apparatus that can be thoroughly and easily cleansed so as to provide milk of the highest sanitary quality.

The chief feature of invention whereby said objects are accomplished consists in a pulsating pump so arranged and constructed that it will both maintain and regulate the rarefaction of the air or degree of vacuum pressure or suction required in the operation of such apparatus. Heretofore it has been common to use merely an exhaust pump for rarefying the air and to provide means intermediate the pump and the milker for regulating the rarefaction of the air, that is, as stated in the art, cause a maximum rarefaction of the air to cause suction on the teat and to alternately contract and relax to some extent the elastic teat cups of the milker to enable them to extract the milk. But this arrangement complicates and adds materially to the amount of mechanism required and separates the pump and pulsator, whereas in this mechanism the pump and pulsator are combined or rather the pump performs both of the functions specified. To this end we have provided in connection with the cylinder and piston of the pump means controlled by gravity, a spring or similar influence, for limiting the rarefaction of the air caused by the pump so it will not act too severely upon the teats and bag of the cow but will be sufficient to withdraw the milk and to cause a proper contraction of the teat cups for the extraction of the milk. Hence in our device the pump is pulsatory and both maintains and regulates the rarefaction of the air in the apparatus.

In order to hold the teat cups or milker up to the bag of the cow during the milking operation, it is necessary that there be at all times a degree of rarefaction of the air in the teat cups. In our device that result is reached by shutting off the suction effect of the pump when the piston is at and near its inner dead center and providing in the milker, preferably in the air inlet port of the teat cup, a check valve which is controlled by a spring, the tension of which can be regulated so that it will yield to incoming air until the rarefaction of the air inside the milker is about six-sevenths atmosphere pressure or less than the atmospheric pressure, and then will close, so that there is always some rarefaction of the air in the milker to hold it in place.

Another feature of the invention consists in the construction of teat cups whereby the upper part is more elastic and readily contracted than the lower part thereof in order that the same may operate properly to assist in extracting the milk and support the teat.

The full nature of the invention will be understood from the accompanying drawings and the following description and claims:

In the drawings Figure 1 is an elevation of the apparatus showing some parts broken away and some parts in vertical section and all parts being shown in the position they occupy on the completion of the downward stroke of the piston of the pump when rarefaction of the air is diminished in the milker. Fig. 2 is a vertical section through the exhaust valve showing it in its condition in Fig. 1. Fig. 3 is a vertical section of the teat cup in relaxed condition. Fig. 4 is a vertical section of the air inlet to the milker and the valve therein closed. Figs. 5, 6, 7 and 8 correspond with Figs. 1, 2, 3, and 4 respectively but show the parts in condition during the suction and milking stroke of the piston of the pump.

In the drawings the group of parts indicated by A constitutes the pump, those marked B the milker that is applied to the teats and bag of the cow, the parts marked C the milk receiver, and between said parts the suction tubes with their proper valves are located. The apparatus shown is adapted to be used in a dairy barn for milking a number of cows in a number of stalls, all of which will be understood from the following detailed description.

In the pump mechanism A a cylinder 10 is provided having a piston 11 operated by the piston rod or pitman 12 on the eccentric or crank 13 secured to the shaft 14 mounted in the bearing 15 extending up from the cylinder 10. The shaft 14 is driven by a pulley 16 from any suitable source of power. While we have shown the foregoing means for actuating the piston, we do not wish to be limited to any particular means for that purpose. The cylinder 10 has an annular chamber or port 17 in its inner wall and about midway of the length thereof from which the pipe 18 leads. The piston has longitudinal grooves in its inner end.

Within the suction chamber of the cylinder 10 of the pump, which in the form herein shown is arranged vertically, there is placed a suction controlling piston 20 corresponding somewhat in external form to the piston 11 and oppositely arranged or disposed. The piston 20 is actuated in opposition to the piston 11 by weights, such as the weight 21 on the lower part of the rod 22 that extends through the lower end of the cylinder and is centrally secured to the piston 20. There are some removable weights 23 on the rod 22 and there is a spring 24 on the rod 22 within the cylinder to act as a buffer against the downward action of the piston 22. We do not wish to be limited to any particular means for actuating the suction controlling piston 20, but the gravity means herein shown is now considered preferable to others that might be employed.

From the pipe 18 there is a downwardly extending pipe 25 with a cock 26 on the lower end thereof that constitutes a settling vessel and drain for moisture that may accumulate in the pipe 18. There is also a pipe 27 extending upwardly from the pipe 18 that has a check valve 28 so arranged that it permits air to be exhausted from the pipe 18 but will not permit any to enter. The pipe 18 is continued along the stalls where the cows are to be milked and at points opposite each stall a flexible pipe 30 leads, there being a valve 31 for closing or opening the communication between pipe 18 and each of the pipes 30. There is a milk receiver apparatus C for each pipe 30, consisting of a milk can or vessel 32 in the mouth of which there is mounted a milk discharging device 33, with which the pipe 30 is connected. It has a chamber in it from which there is a milk outlet port 34, said port being closed by the check valves 35.

The milker consists of flexible teat cups 40 mounted on an inflexible pipe 41, from which a flexible tube 42 leads to the milk receiving apparatus C, said tube 42 communicating with the port 43 in the milk discharger 33 which is closed by a check valve 44 that permits air and milk to enter the chamber of the milk discharger but not return. The pipe 42 leads from one end of the stiff pipe 41 of the milker, while at the other end of said pipe 41 there is an air inlet port 45 closed by a spring controlled check valve 46.

The teat cups 40 are made of rubber, flaring upwardly and adapted to fit the teat 47 of the cow. The upper flaring portion thereof is comparatively thin and contractile so that under the influence of suction, it will compress the teat and assist to force out the milk. The middle portion of said teat cup is made relatively thicker than the upper portion and rendered considerably stiffer by a spiral wire 48 being embedded therein, the arrangement being such that the middle portion of the teat cup will fit the lower part of the teat and yet not press it too much to permit the issue of milk.

In operation, assuming the pump to be running and the valve 31 closed, the milk discharger 33 is secured to the milk can and the milker is applied to the cow's bag and then the valve 31 is opened, whereupon the pump partially exhausts the air from the system including the milker so as to create the desired rarefaction of the air, whereupon the teat cups take hold of the cow's teats and the milking operation proceeds until the cow is "stripped". As stated, the maximum degree of rarefaction of the air in the milker is regulated by the suction controlled piston 20 and the weights 21 and 23 on the rod 22. During the milking or working movement of the piston the rarefaction of air throughout the system and in the milker will increase until there be a sufficient rarefaction created in the cylinder 10 to draw up the piston 20 in spite of the gravity of the weights 21 and 23. It is found desirable for milking purposes that the vacuum pressure or suction be in the neighborhood of one-half an atmosphere and we prefer to make the weight 21 slightly less than enough to produce a half atmosphere in the system of the apparatus and the total of the weights 21 and 23 will be more than sufficient to produce a half atmosphere, whereby from the removable weights the desired maximum rarefaction of the air may be regulated as desired. The suction controlling piston 20 will follow the piston 11 up, as has been described and return down ahead of it, the piston 20 being maintained automatically at such distance from the piston 11 that the suction acting on the piston 20, will just balance the weight of said piston, the rod 22 and the weights 21 and 23. If the volume of the clearance space between the two pistons 11 and 20 added to that of the system pipes, milk receiver and milker less whatever air and milk there may already be in the system, is small compared to the displacement of the piston 11, the maximum rarefaction of the air will be attained when the piston 11 has made only a comparatively small part of its stroke. If the space in the system be increased, the piston 11 will make a comparatively greater portion of its stroke before the maximum rarefaction of the air is reached. Hence, the length of the pipe may be varied without affecting the operation of the pump, for at some period in the suction stroke of the piston 11 the desired maximum degree of suction or vacuum pressure will be reached, as that is automatically regulated by the suction controlling piston 20. But an increase in the pipe will affect the length of time the maximum rarefaction of the air lasts with relation to the time for revolution of the crank or eccentric 13. This variation in time may be reduced to a desirable practical amount by making the displacement of the piston 11 relatively great. On the return or downward stroke of the piston 11 the atmospheric pressure will be restored before said piston 11 completes its stroke, because there will have been some air which has entered the system during the suction period, especially through the air port 45. Hence, on said downward or return stroke of the piston 11 the excess air will be driven out from the exhaust valve 28. Hence, the pump as arranged herein, will produce throughout the entire pipe system, the milk receiver and the milker, periods of greater rarefaction of the air alternating in the milker with shorter periods of lesser rarefaction of the air, and in the system between the pump and valve 44 alternating with shorter periods of atmospheric pressure. The suction stroke of the piston 11, acting through pipe 18 and tube 30 opens said valve 44 so that the action is transmitted to the milk receiver and teat cups. The strength of the spring 146 that controls valve 46 is such that it permits said valve to open and admit air during the periods of greater rarefaction of the air and facilitates the movement of the milk along the tube 42, but said spring will close said valve 46 when the rarefaction of the air in the tube 42 has reached a minimum such as is found desirable and necessary to keep the milk receiver from falling from the cow's teats or bag. This minimum rarefaction of the air occurs when the piston is at or near its inner dead center and during such movement of the pump piston, the valve 44 will not permit the return of air into the tube 42, whereby the minimum rarefaction of the air in the milker will depend upon and be regulated by the tension of the spring 146 on the valve 46. It is found desirable in experience to make this minimum rarefaction of the air about six-sevenths of an atmosphere. The rarefaction of the air in the milker, therefore, will vary from one-half of an atmosphere to six-sevenths of an atmosphere alternately and synchronously with the motion of the piston 11 of the pump. The milk is extracted from the teat chiefly by the suction which is aided by the teat cup, which contracts at its upper ends and compresses the upper part of the teat during the period of maximum air rarefaction. The action of the suction is such as to draw the milk from the teat, therefore, in a natural and harmless manner. This is materially aided by the motion of the upper and softer parts of the teat cup. When extracted from the teat, the milk flows through the pipes 41 and 42 to the milk receiver and in such movement is aided by the air admitted through the air port 45, during each period of maximum rarefaction of the air, whereupon the valve 35 drops downwardly and permits the milk to flow from the milk discharger into the milk can.

By "constantly closed communication" in the claims herein is meant that the pump cylinder and its communication with the milker is constantly closed against incoming air, the air relief being located only in the milker. With this arrangement the relief comes instantly where needed.

What we claim is our invention and desire to secure by Letters Patent is:

1. A milking machine including a milker, a pump provided with a cylinder in constantly closed communication with the milker, a closed piston in said cylinder, and yielding means which tends to resist the suction action of said piston.

2. A milking machine including a milker, a pump provided with a cylinder in constantly closed communication with the milker and a closed piston in said cylinder, and a yielding follower in said cylinder that tends to resist the suction action of the piston.

3. A milking machine including a milker, a pump provided with a cylinder in constantly closed communication with the milker and a closed piston in said cylinder, and a gravity controlled follower in the cylinder.

4. A milking machine including a milker, a piston suction pump, a communication between the pump and milker constantly closed against incoming air, means for closing said communication from the pump during its return stroke, and means in the milker for admitting air and limiting the maximum rarefaction thereof in the milker.

5. A milking machine including a milker, a pump in communication with the milker, a milk receiver in said communication, a check valve in said communication between the milker and milk receiver adapted to close by an increase of air pressure in the milk receiver, and a valve in the milker for admitting air when the rarefaction of air therein becomes excessive.

6. A milking machine including a milker, a piston pump, a communication between the pump and milker, a milk receiver in said communication, a check valve in the milk receiver for closing the communication therefrom to the milker during decrease of air rarefaction in the milk receiver, and a spring closed valve for admitting air into the milker.

7. A milking machine including an exhaust pump having a cylinder with a centrally located port, a suction piston operating in one end thereof, a suction controlling piston located in the other end thereof, the inner portions of said pistons being recessed longitudinally, and means for regulating the resistance of said suction controlling piston.

8. A milking machine including a pump provided with a cylinder, a suction creating piston therein, a suction controlling piston therein opposing the suction creating piston, and gravity controlled means for regulating the resistance of the suction controlling piston.

9. A milking machine including a pump provided with a vertical cylinder, a suction creating piston in the upper end thereof, an opposing suction controlling piston in the lower end thereof, a vertical rod extending down from said suction controlling piston, and a weight applied to said rod for furnishing resistance to said suction controlling piston.

10. A milking machine including an exhaust pump provided with a vertically disposed cylinder, a suction creating piston in the upper end thereof, a suction controlling piston in the lower end thereof, a rod secured centrally to the lower piston and extending below the cylinder, means on the lower end of the cylinder for guiding said rod, a spring between said guiding means and said lower piston, and removable weights on said rod.

11. A milking machine including a milker with an air inlet at one end, a milk discharger with which the discharge end of the milker is attached, a check valve for closing said discharge end of the milker, and an exhaust pump connected with said discharger and in constantly closed communication with said milker on the suction stroke thereof, said pump being provided with yielding means for determining and limiting the rarefaction of air caused thereby in the milker.

12. A milking machine including a milker with an air inlet in one end, a check valve for closing the air inlet in the milker, a spring tending to hold said check valve closed, a milk discharger connected with the other end of the milker, a check valve for closing said milk discharger, and an exhaust pump connected with said discharger and in constantly closed communication therethrough with said milker, said pump being provided with yielding means for determining and limiting the rarefaction of air caused thereby in the milker.

13. A milking machine including a milker with an air inlet in one end, a check valve for closing the air inlet in the milker, a spring tending to hold said check valve closed, a milk discharger including a chamber having an inlet and an outlet, a connection between the inlet of the milk discharger and the other end of said milker, a check valve in the inlet of the milk discharger, a check valve in the outlet of said milk discharger, and an exhaust pump connected with the chamber of said discharger and in constantly closed communication therethrough with said milker, said pump being provided with yielding means for determining and limiting the rarefaction of air caused thereby in the milker.

In witness whereof, we have hereunto affixed our signatures in the presence of the witnesses herein named.

BENJAMIN PERRY REMY.
FRANK IRWIN REMY.

Witnesses:
G. B. SLAYMAKER,
C. E. HASTINGS.